(12) United States Patent
Smith et al.

(10) Patent No.: US 7,885,906 B2
(45) Date of Patent: Feb. 8, 2011

(54) PROBLEM SOLVING SYSTEM AND METHOD

(75) Inventors: Gary S. Smith, Castle Rock, CO (US);
Joseph P. White, Castle Rock, CO (US);
Christopher B. Koller, Goose Creek, SC (US)

(73) Assignee: Raytheon Company, Waltham, MA (US)

( * ) Notice: Subject to any disclaimer, the term of this patent is extended or adjusted under 35 U.S.C. 154(b) by 729 days.

(21) Appl. No.: 11/841,073

(22) Filed: Aug. 20, 2007

(65) Prior Publication Data
US 2009/0055335 A1      Feb. 26, 2009

(51) Int. Cl.
G06N 5/00      (2006.01)
(52) U.S. Cl. .......................... 706/19; 706/45
(58) Field of Classification Search .............. 706/19, 706/45
See application file for complete search history.

(56) References Cited

U.S. PATENT DOCUMENTS

| | | | |
|---|---|---|---|
| 5,311,423 | A | 5/1994 | Clark |
| 6,035,278 | A | 3/2000 | Mansour |
| 6,490,566 | B1 | 12/2002 | Schmidt |
| 6,584,400 | B2 | 6/2003 | Beardsworth |
| 6,594,637 | B1 | 7/2003 | Furukawa et al. |
| 6,687,678 | B1 | 2/2004 | Yorimatsu et al. |

OTHER PUBLICATIONS

Erkkinen, et al., Automatic Flight Code Generation with Integrated Static Run-Time Error Checking and Code Analysis, AIAA Modeling and Simulation Technologies Conference and Exhibit, Aug. 21, 2006, pp. 1-9.*
Sunderland, et al, Flexible XML-based Configuration of Physical Systems, Software Practice and Experience, 2004, vol. 34, pp. 1149-1155.*
Pohlheim, et al., Parallel Evolutionary Optimization under MATLAB on Standard Computing Networks, GECCO'99—Proceedings of the Genetic and Evolutionary Computation Conference, 1999, pp. 174-176.*

* cited by examiner

*Primary Examiner*—Wilbert L Starks, Jr.
(74) *Attorney, Agent, or Firm*—Glenn H. Lenzen; Polsinelli Shughert PC (57) ABSTRACT

Provided is a problem solving system. More specifically, the problem solving system provides an interface operable to receive user supplied input data, the input data having at least one user defined characteristic. The system provides an algorithm pool having a plurality of pre-defined algorithms, each algorithm having at least one associated algorithm characteristic. The system also provides a data source pool having at least one data source, each data source having at least one data characteristic. An algorithm selector is in communication with the interface, algorithm pool and data source pool. The algorithm selector operable to; receive the input data and review the at least one user defined characteristic; select at least one algorithm from the algorithm pool based on the at least one user defined characteristic and selected algorithm's algorithm characteristic; select at least one data source from the data source pool based on the at least one user defined characteristic indicating a need for additional data and the selected data source's data characteristic; and bundle the input data, the selected algorithm and data source as a job operation for execution by a job operation subsystem to obtain a result, and return the result to a designated party. An associated method of solving a problem with such a system is also provided.

33 Claims, 5 Drawing Sheets

PROBLEM SOLVING SYSTEM AND METHOD

FIELD

This invention relates generally to the automated problem solving, and in particular to the selection of one or more algorithms and data sources to determine a result for a generically stated problem.

BACKGROUND

Complex systems present diverse algorithmic resource and data options. However, a user of such a system must clearly understand the data type options as well as the algorithm options in order to utilize them. More specifically, to use an algorithm the user must know in advance the correct mapping of an algorithm's inputs to outputs as well as the required format for the input and/or output.

As new algorithms and/or data types are added to the system, and old algorithms and data types removed, the user must maintain a mapping list of what is available and what is required—a task that may itself be a challenging problem in a large system that is networked and made available to multiple users who may at times be operating without direct intercommunication between the users.

In addition, a large system may have general aspects that are widely desired by a variety of different users utilizing a variety of different hardware and software systems. The differences between the systems can and often do impose yet another burden upon the user, as he or she must know in advance how to bridge different systems. Often times this bridging is not a task easily accomplished in real time, but rather is something that requires pre-configuration.

For example, and only in a very general sense, a Unix network may support a repository of data files which a Windows platform user may wish to suddenly access in a quest to resolve a resource availability question in the determination of a scheduling event (such as the location of a satellite at a specific time over a geographic area). Samba is a well known file accessing system that permits Windows platform systems to exchange data with Unix/Lynx systems, but the Samba application must be preexisting and configured on the Unix/Lynx system before such a connection can be made.

So, in addition to the user having to anticipate the types of intersystem communications that might be desired in the future, to use a particular algorithm or solution type solver, the user must know and define for the system precisely what kind of problem is at hand, the resources that will be required to solve the problem, the location of the resources, and pre-format and/or pre-structure the data and/or resource so that the requirements of the algorithm are properly met.

These requirements as imposed upon the user do not permit such a system to be easily utilized in a dynamic environment. As a result, although a solution option might exist within one faction of the system, a user may opt to develop his or her own solution. Although perhaps viable in the short term, such courses of action lead to massive redundancy and resource waste. Further still, an update of data information may not be realized by all users.

Hence, there is a need for a problem solving method and system that overcomes one or more of the technical problems found in existing systems.

SUMMARY

This invention provides a system and method for automated problem solving.

In particular, and by way of example only, according to one embodiment of the present invention, provided is a problem solving system, including: an interface operable to receive user supplied input data, the input data having at least one user defined characteristic; an algorithm pool having a plurality of pre-defined algorithms, each algorithm having at least one associated algorithm characteristic; a data source pool having at least one data source, each data source having at least one data characteristic; an algorithm selector in communication with the interface, algorithm pool and data source pool, the algorithm selector operable to; receive the input data and review the at least one user defined characteristic; select at least one algorithm from the algorithm pool based on the at least one user defined characteristic and selected algorithm's algorithm characteristic; select at least one data source from the data source pool based on the at least one user defined characteristic indicating a need for additional data and the selected data source's data characteristic; and bundle the input data, the selected algorithm and data source as a job operation for execution by a job operation subsystem to obtain a result, and return the result to a designated party.

In yet another embodiment, provided is a problem solving method in a system environment having an algorithm pool, including: establishing an algorithm pool having a plurality of pre-defined algorithms, each algorithm having at least one associated algorithm characteristic establishing a data source pool having at least one data source, each data source having at least one data characteristic; providing user data to the system as an instruction set selected from the group consisting of: a job request having at least one job characteristic; a data source request having at least one data source characteristic and a command to add or remove a data source associated with the data characteristic; an algorithm request having at least one algorithm characteristic and a command to add or remove an algorithm associated with the algorithm characteristic; reviewing the instruction set and; in response to a determination of a data source request, adding or removing the indicated data source from the data pool; in response to a determination of an algorithm request, adding or removing the indicated algorithm from the algorithm pool; in response to a determination of a job request, selecting at least one algorithm from the algorithm pool based on the at least one job characteristic and selected algorithm's algorithm characteristic; selecting at least one data source from the data source pool based on the at least one job characteristic indicating a need for additional data and the selected data source's data characteristic; and applying the selected algorithm, selected data source and job characteristic to provide a response to the job request.

In yet still another embodiment, provided is a computer-readable medium on which is stored a computer program for solving problems, the computer program including: an input routine operatively associated with an input device for permitting a user to enter user supplied input data, the input data having at least one user defined characteristic; an algorithm pool routine operative to establish an algorithm pool having a plurality of pre-defined algorithms, each algorithm having at least one associated algorithm characteristic; a data source pool routine operative to establish a data source pool having at least one data source, each data source having at least one data characteristic; an algorithm selection routine operatively associated with the input routine, the algorithm pool routine and the data source pool routine, the algorithm selection routine being operable to; receive the input data and review the at least one user defined characteristic; select at least one algorithm from the algorithm pool based on the at least one user defined characteristic and selected algorithm's algorithm characteristic; select at least one data source from the data source pool based on the at least one user defined characteristic indicating a need for additional data and the selected data source's data characteristic; and bundle the input data, the selected algorithm and data source as a job operation for execution by a job operation subsystem to obtain a result, and return the result to a designated party.

DETAILED DESCRIPTION

Before proceeding with the detailed description, it is to be appreciated that the present teaching is by way of example only, not by limitation. The concepts herein are not limited to use or application with a specific type of problem solving system. Thus, although the instrumentalities described herein are for the convenience of explanation, shown and described with respect to exemplary embodiments, it will be appreciated that the principles herein may be applied equally in other types of problem solving systems.

Figure 1:
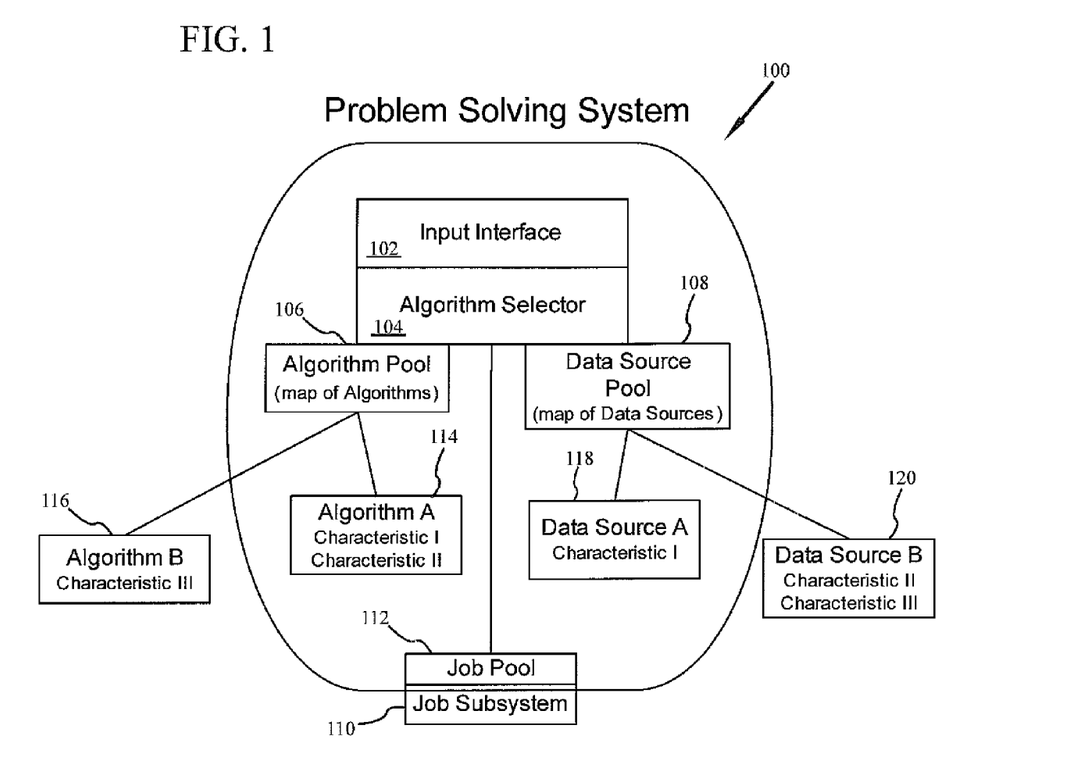
FIG. 1 illustrates a high level block diagram of a problem solving system in accordance with at least one embodiment.

FIG. 1 is a high level conceptual diagram of the problem solving system in accordance with at least one embodiment. Problem solving system 100 may be implemented on a computer having typical computer components, such as a processor, memory, storage devices, and input and output devices. During operation, problem solving system 100 may be maintained in active memory for enhanced speed an deficiency. In addition in at least one embodiment, problem solving system 100 is operated on a computer network and utilizes distributed resources.

Problem solving system 100 is a dynamic system that provides a clean, simple easy to use and fast responding interface to algorithmic resources in an enterprise system. Specifically, users interact with the problem solving system 100 by adding data sources, adding algorithms using an algorithm capability description, and requesting that a problem be solved using a find solution request.

As is further discussed below, the problem solving system 100 advantageously provides automatic algorithm selection In various embodiments, the problem solving system may also provide one or more additional features such as, but not limited to: partitioning of users, algorithms, and data; dynamic linking of algorithms and the data required to run them; runtime addition and removal of algorithms and data; and the allowance for geographical separation of framework and clients.

With respect to FIG. 1, in at least one embodiment problem solving system 100 includes an interface 102, an algorithm selector 104, an algorithm pool 106 and a data source pool 108. In at least one alternative embodiment, the problem solving system 100 also has a job operation subsystem 110, which in at least one embodiment further offers a job pool 112. In at least one embodiment, such as where problem solving system 100 is implanted in a computer environment, the interface 102 is provided by an interface routine, the algorithm selector 104 is provided by an algorithm selector routine, the algorithm pool 106 is provided by an algorithm pool routine and the data source pool 108 is provided by a data source pool routine.

The interface 102 is operable to receive user supplied input data, the data having at least one user defined characteristic. The algorithm pool 106 has a plurality of pre-defined algorithms, each algorithm having at least one associated algorithm characteristic. The data source pool 108 has at least one data source, each data source having at least one data characteristic.

In at least one embodiment the algorithm pool 106 is best described as a mapping resource providing a capability description for each algorithm known to the problem solving system 100. More specifically, the algorithm pool 106 provides a mapping of the input to outputs for each algorithm identified in the algorithm pool 106, the location of the algorithm (local or remote) and the procedure to call the algorithm. As shown in FIG. 1, algorithm pool 106 has knowledge of Algorithm A 114 that is local to the problem solving system 100 and Algorithm B 116 that is remote to the problem solving system 100. In at least one embodiment, the algorithm pool 106 is maintained as an XML table.

Similarly, in at least one embodiment, the data source pool 108 is best described as a mapping resource. More specifically, the data source pool 108 provides a map of the known data sources as abstractions, i.e., providing location (local or remote) and the procedure to call the data source. As shown in FIG. 1, data source pool 108 has knowledge of Data Source A 118 that is local to the problem solving system 100 and Data Source B 120 that is remote to the problem solving system 100. In at least one embodiment, the data source pool 108 is maintained as an XML table.

As indicated by the illustration of FIG. 1, the algorithm selector 104 is in communication with the interface 102, the algorithm pool 106 and the data source pool 108. Summarized simply, the algorithm selector 104 is operable to receive input data from the input interface 102 and review the at least one user defined characteristic. In one embodiment, based upon the reviewed user defined characteristic, the algorithm selector 104 will select at least one algorithm from the algorithm pool 106. The algorithm selector 104 will also select at least one data source from the data source pool 108 based on the user defined characteristic indicating a need for additional data and the selected data source's data characteristic. The algorithm selector 104 then bundles the input data, selected algorithm and data source as a job operation for execution by a job operation subsystem to obtain a result for return to a designated party.

The job operation subsystem 110 may be an incorporated element of the problem solving system 100, or in alternative embodiment it may be an element that is external to the problem solving system 100, and as such is shown to straddle the bounding line defining problem solving system 100. As is further discussed below, the job operation subsystem 110 may also provide a job pool 112 structured to receive and hold job operations provided by the algorithm selector 104 as they await execution.

In addition, to continue with the summary, in response to the user supplied data being data source information including a data characteristic, the algorithm selector 104 is operable to provide the data source information to the data source pool 108, which in turn will add or remove a data source based on the data source information. Likewise, in response to the user supplied data being algorithm information, the algorithm selector 104 is operable to provide the algorithm information to the algorithm pool 106, which in turn will add or remove an algorithm based on the algorithm information.

Figure 2:
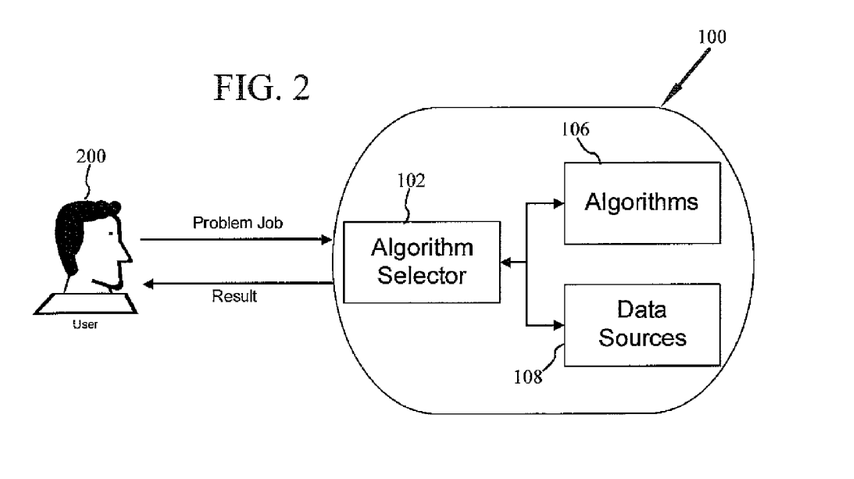
FIG. 2 illustrates the perceived user interaction with the problem solving system of FIG. 1 in accordance with at least one embodiment.

FIG. 2 conceptually illustrates the advantageous nature of problem solving system 100. The user 200 simply provides user input data such a job problem to the problem solving system 100. As discussed and described above, the problem solving system 100 evaluates the provided job problem, and based on the analysis selects one or more appropriate algorithms with one or more data sources to assemble a job operation. The job operation is executed and the user is provided with the desired results. The extent of the algorithm options, configuration requirements, system distribution, algorithm locations and data source types and locations are entirely masked from the user. It is to be understood that a user of the problem solving system 100 may be a human user or other system.

Figure 3:
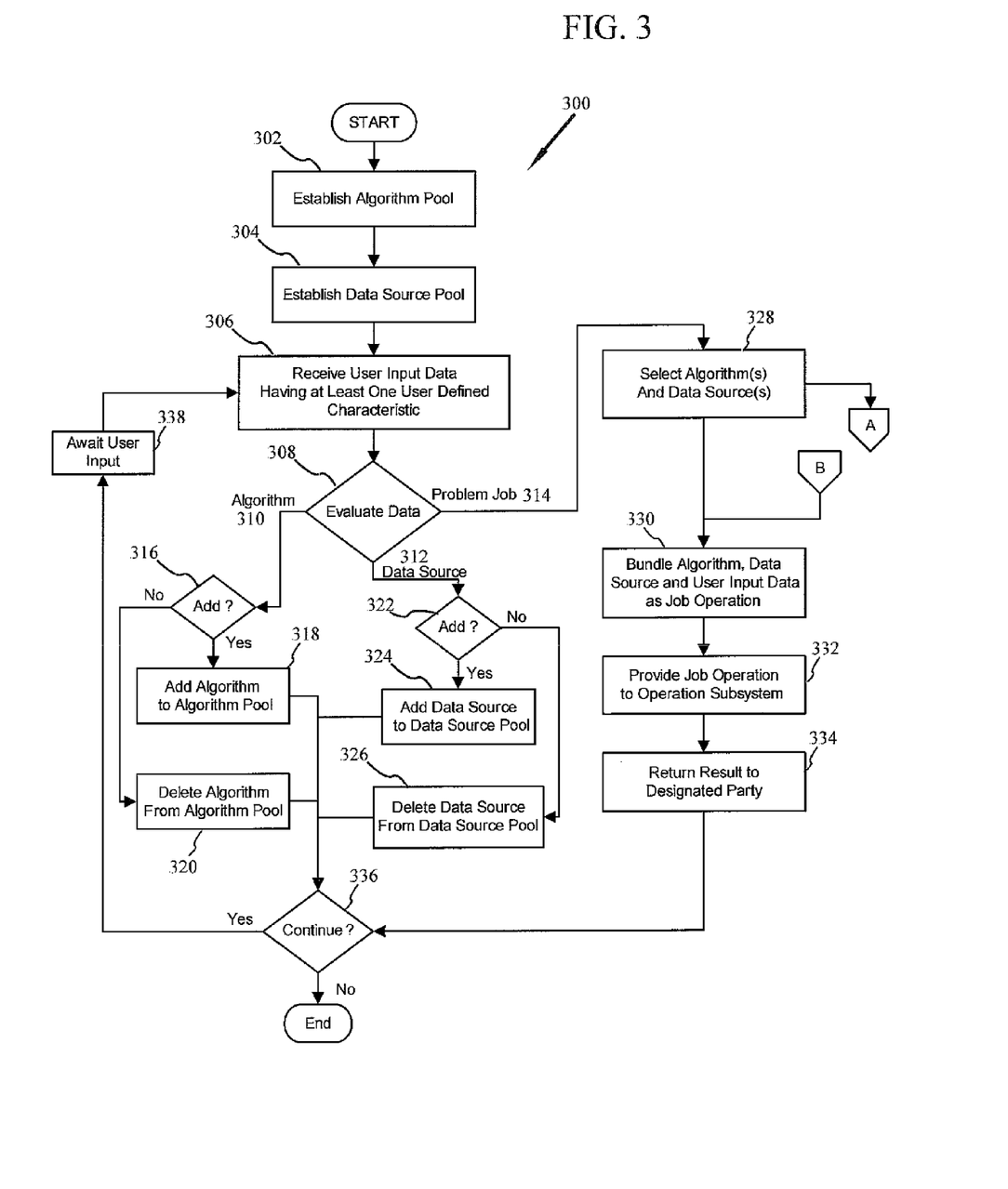
FIG. 3 is a high level flow diagram of a method of operating the problem solving system in accordance with at least one embodiment.
Figure 4:
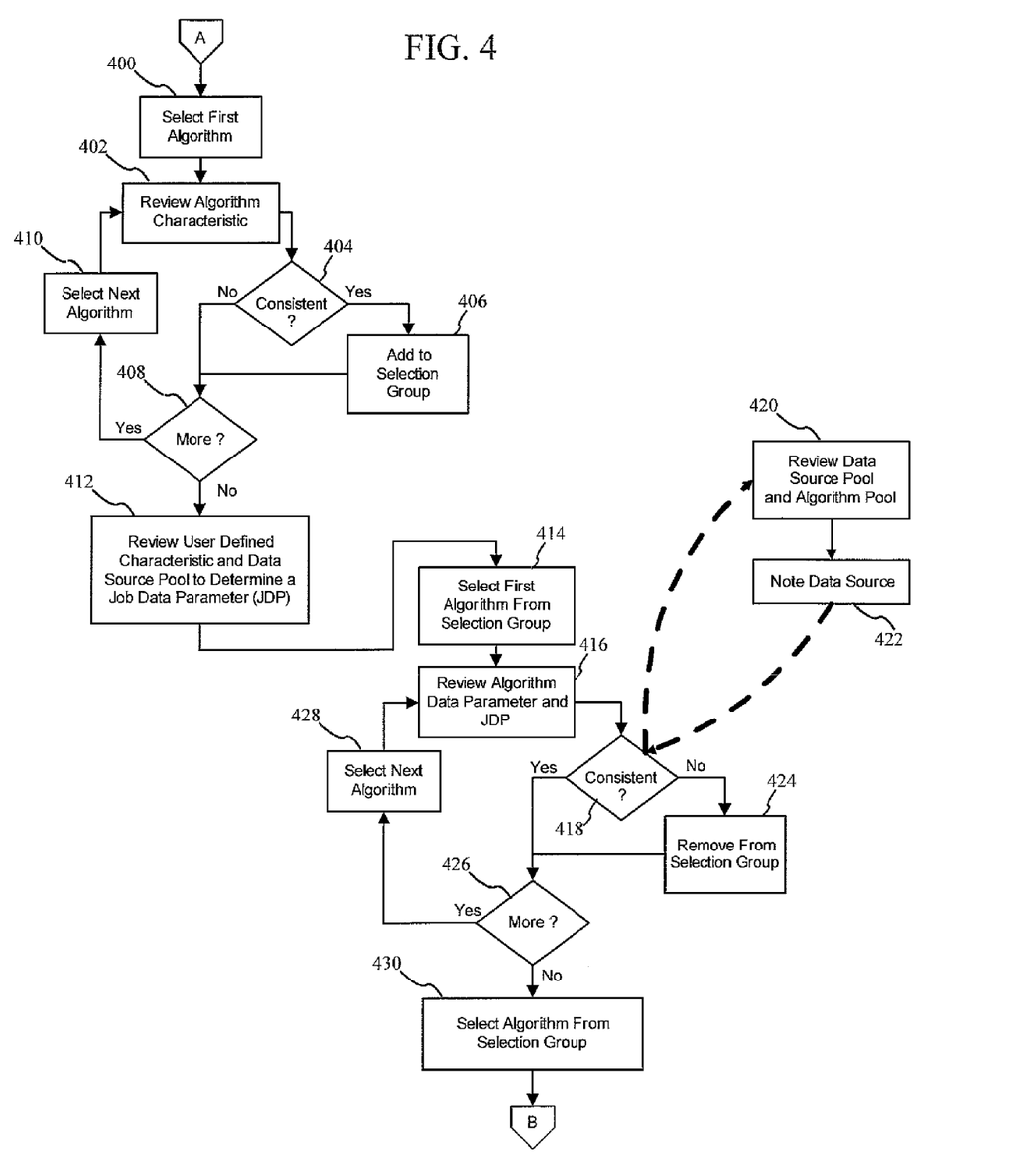
FIG. 4 is a flow diagram further illustrating refined operations for algorithm selection in accordance with at least one embodiment.
Figure 5:
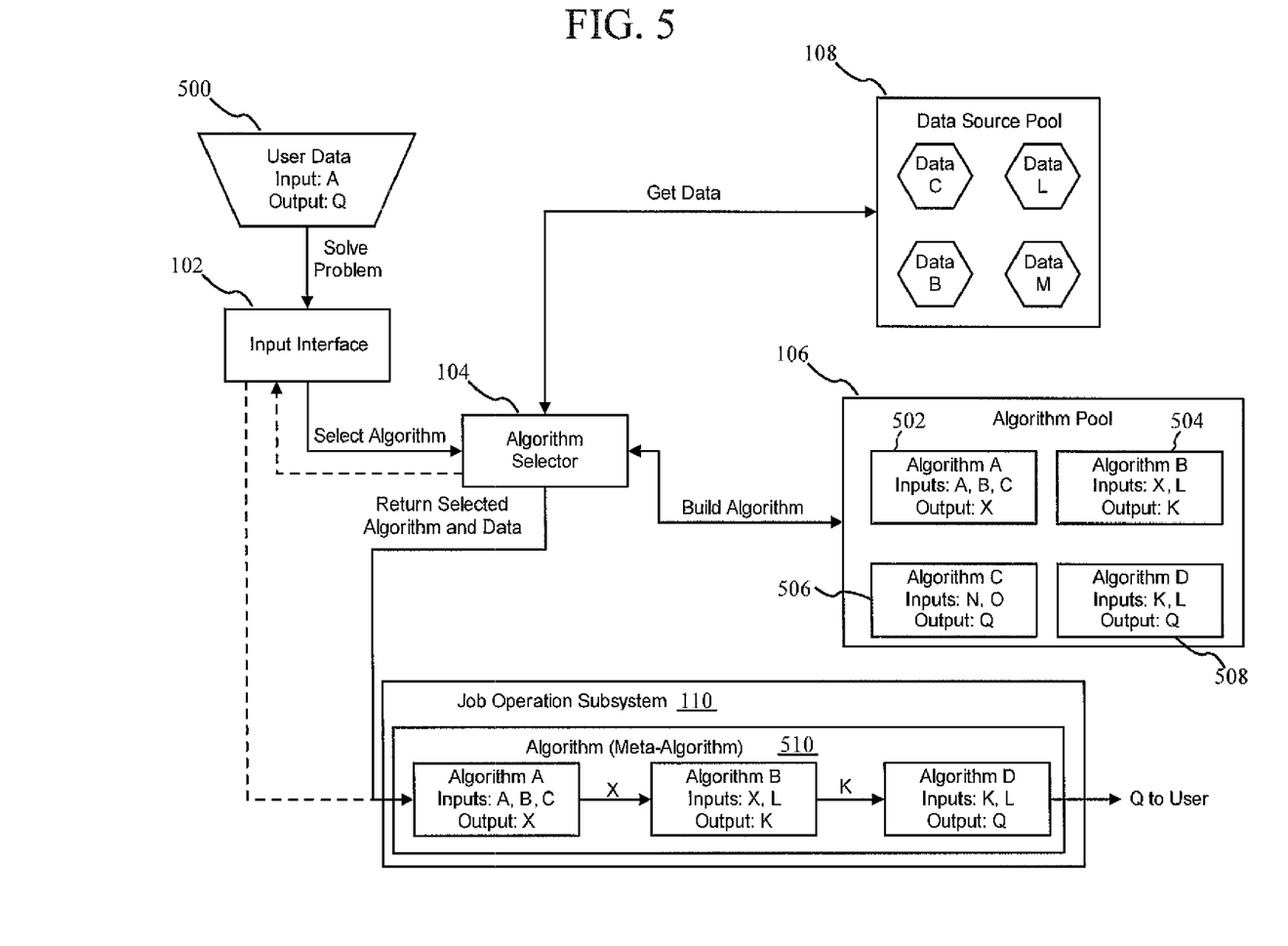
FIG. 5 is a block flow diagram illustrating an example of specific problem solving for a provided problem job in accordance with at least one embodiment.

The process and operation of problem solving system 100 in accordance with at least one embodiment will now further be described with respect to the flow diagrams of FIGS. 3 and 4 and the block diagram of FIG. 5. It is further understood and appreciated that the steps as they are herein described are not necessarily required to be performed in the order as herein described, but that this ordering is exemplary of at least one embodiment and has been selected to facilitate the ease of discussion and illustration.

The components of problem solving system 100, e.g., input interface 102, algorithm selector 104, algorithm pool 106 and data source pool 108 share communication and availability status with the other components to which they are directly connected. When a component initializes, it uses a handshaking mechanism to determine the status of its connections. In at least one embodiment, the communication protocol between components is automatically determined and dispositioned accordingly: object-to-object communication for components within a single process space, versus messaging for network distributed components (as may occur with the data source pool 108 and/or algorithm pool 106 where at least one data source or algorithm is located remotely). Communication between the components in the problem solving system may be either synchronous or asynchronous.

With respect to FIG. 3, upon commencement of operation to perform a problem solving method 300 the problem solving system 100 will establish an algorithm pool 106, block 302. More specifically, problem solving system 100 is provided with an initial set of known algorithms (at least one), each having at least one algorithm characteristic. In one embodiment, the algorithm characteristic(s) include, but are not limited to, an algorithm capability description and a procedure to retrieve the algorithm.

The problem solving system 100 will also establish a data source pool 108, block 304. More specifically, the problem solving system 100 is provided with an initial set of known data sources (at least one), each having at least one data characteristic. In one embodiment, the data source characteristic(s) include, but are not limited to, a location of the data source and a procedure to retrieve the data.

With the algorithm pool 106 and data source pool 108 established, the problem solving system 100 is initialized. As such, the problem solving system 100 is set to receive user input data having at least one user defined characteristic, block 306. Upon receipt of the user input data, the data is evaluated, block 308. In at least one embodiment, this evaluation is to determine one of three options—that the user input data regards an algorithm 310, a data source 312 or a problem job 314

Problem solving system 100 is intended to be adaptable and implanted in many environments and on many different platforms. This fungability is enhanced in at least one embodiment through the use of the Extensible Markup Language, otherwise known as XML. XML provides a text-based means to describe and apply a three-based structure to information XML code is understood and appreciated to consist of elements and attributes, and of course nested elements.

Through the structured format, XML permits problem solving system 100 to have a pre-defined format for the user input data. Indeed, by standardizing the input through XML, problem solving system 100 is free to operate without additional overhead complexity. So long as XML translation is performed before engaging problem solving system 100, or in real time with the engaging of problem solving system 100, the problem solving system 100 is operable to assist a wide variety of users in a wide variety of environments and platforms.

In the first instance, it is assumed that the user input data regards an algorithm. In at least one embodiment, the operations that may be performed are either to add an algorithm or to delete an algorithm. To update a known algorithm, it is appreciated that both a delete (to remove the old algorithm) and an add (to add the new algorithm) may be performed. More specifically, the user data is queried, block 316, to determine if directive is to add or delete, blocks 318 and 320, respectively.

When adding an algorithm to the problem solving system 100, the user must either specify the location of the algorithm or provide a reference to the algorithm itself. In addition, every algorithm provided to the problem solving system 100 must be supplied with an algorithm capability description. The algorithm capability description (ACD) describes the output of the algorithm given a certain set of inputs. In at least one preferred embodiment, the ACD is an XML document that accompanies the algorithm when it is added to the framework. The algorithm itself may be added as a java object, or as a reference to the algorithm may be provided via XML as well.

It is to be under stood and appreciated that by utilizing the ACD and the algorithm itself as an object or referenced object, the algorithm need not be located within the problem solving system 100 or even truly a part of the problem solving system. More specifically, the added algorithm may be part of an external third party package, or even an open source algorithm. As the algorithm may be utilized by the problem solving system 100 without being an incorporated element of the problem solving system 100 it is understood and appreciated that the use requirements for open source objects are fully complied with and the source code of the problem solving system 100 need not be made available as open source as well.

In a second instance, it is assumed that the user input data regards a data source. In at least one embodiment, the operations that may be performed are either to add a data source or to delete a data source. To update a known data source, it is appreciated that both a delete (to remove the old data source) and an add (to add the new data source) may be performed. More specifically, the user data is queried block 322, to determine if directive is to add or delete, blocks 324 and 326, respectively.

With respect to a data source, the user input data contains a location from which to retrieve the data as well as a call for retrieving the data from the specified location. In addition, the input data may also specify the type of data that will be returned. Within the problem solving system 100, the data sources are used to provide inputs and parameters to the algorithms that are being executed in the assembled job operations.

In at least one embodiment, the data in the data source may be completely defined within the user input data provided to the problem solving system 100, but the user input data may also omit one or more elements of data useful in determining a result. In such instances, the data source pool 108 is utilized.

Data sources can be added to the problem solving system 100, and specifically the data source pool 108 as, in at least one embodiment, an object or in an XML format. The data source pool 108 catalogs the data source for lookup purposes, and the data source itself (if supplied as an object and not a reference to a remote object), is stored for later retrieval. Typically the data source will be handled as abstractions as it is only necessary for the problem solving system 100 to understand how the data sources map to algorithmic input. More specifically, it is advantageously not required for the problem solving system 100 to understand the inner workings of the data sources themselves.

Data sources may contain sub-data sources, which are in turn data sources themselves. The use of sub-data sources allows for the construction of an aggregated data source that contains many different types of data for any given algorithms execution. This aggregation of many different data sources allows algorithms to utilize meta-data without knowledge of how to construct, or deconstruct, the different sources that comprise the meta-data source.

In the third instance, the evaluated user input data, block 308, is determined to be a problem job 314. As in the case of user input data representing an algorithm or a data source, the problem job user input data is provided in the form of an XML document or an object that is compliant with the problem solving system 100 input interface 102

In at least one embodiment the user input data representing the problem job contains: user specified data sources (optional); the format of the output data (required); the identity of a designated party to receive the results (required); constrains on solving the problem (optional); objective for consideration in satisfying the problem solving request; and providing a result (optional).

The ability to automatically select one or more algorithms to satisfy a problem job is a key and advantageous feature of the problem solving system 100. More specifically, by having the problem solving system 100 select the appropriate one or more algorithms the user is no longer required to understand the types of algorithms available to solve the problem or the methodology required to provide the data to those algorithms for execution. The algorithm selector 104 automatically selects an appropriate algorithm based on the user defined output type, the available data (user provided and/or data source pool provided) and the algorithms that are present in the algorithm pool 106, block 328.

The selected algorithm, data source(s) and user input data are then bundled as a job operation, block 330. This job operation is then provided to the job operation subsystem for execution, block 332. The result is then provided to a designated party, block 334, which may be the user providing the problem job as the user input data or a specified third party. As a user may be a human user or another system, so to the receiving party may be a human user or another system.

Following the operations to add or remove an algorithm from the algorithm pool, the operations to add or remove a data source from the data source pool, or the operations to provide a solution to the problem job, the system returns to a state of readiness. If the user(s) have not otherwise indicated that the system should exit, block 336, the system returns to awaiting user input, block 338.

With respect to the general overview of algorithm selection, block 328, the process for algorithm selection may be summarized as follows. First, retrieve all of the algorithms that can provide the output specified in the request. Second, check to see if the required inputs for those algorithms are available from the data source pool if user adequate user data is not otherwise provided. Third, evaluate the constraints and objectives, if provided, against the algorithms that can provide the desired output. Fourth, select an algorithm that can provide the desired output and best address the objectives and constraints specified by the user and bundle the user data, selected algorithm and data source as a job operation.

FIG. 5 is provided to help further demonstrate the method of algorithm selection, and indeed data source selection, in connection with the flow diagrams of FIGS. 3 and 4. As indicated in FIG. 5, the user input data for the problem job 500 includes Input A and a desired output of Q. This data is provided to the problem solving system 100 and in turn to the algorithm selector 104.

Evaluated as a problem job 314 in block 308 (see FIG. 3), the method proceeds to the selection of an algorithm based on the user defined characteristics of the user input data and the algorithm characteristic, block 328. The selection of the appropriate algorithm is more fully illustrated in FIG. 4 by off page reference A.

In FIG. 5, the algorithm pool 106 is shown to contain four algorithms, specifically Algorithm A 502 requiring inputs A, B and C and providing output X, Algorithm B 504 requiring inputs X and L and providing output K, Algorithm C 506, requiring inputs N and O and providing output Q, and Algorithm D 508 requiring inputs K and L and providing output Q.

In the most simple form, the selection of algorithms is an iterative process starting with the first algorithm, block 400. The algorithm characteristics are reviewed to determine if they are compliant with the requested output, blocks 402 and 404. If the algorithm is compliant, it is added to a selection group, block 406. If there are more algorithms in the algorithm pool, block 408, the next algorithm is selected, block 410 and the characteristics are reviewed and evaluated once again to determine if the algorithm should be added to the selection group.

With respect to FIG. 4 and the depicted algorithms, the iterative process of blocks 402 through 410 will return a selection group of Algorithm C 506 and Algorithm D 508, as both indicate an output Q which meets with the request of the user. The system will also review the user defined characteristics and the data source pool 108 to determine at least one job data parameter (JDP), block 412 In this example, the initial JPD is the user provided input element A.

Algorithm C 506 is selected from the selection group, block 414 and reviewed with respect to the JDP, block 416. It is noted that Algorithm C 506 requires inputs N and O. The review for compliance may well involve a branch to return to the algorithm pool 106 and a review of the data source pool 108, as indicated by block 420. These branched reviews are in at least one embodiment, recursive. More specifically, the recursive operations in one embodiment include repeating at least the process of selection and evaluation set forth in blocks 400 through 408.

The user has only supplied input A and a review of the data source pool indicates that although data sources B, C, L and M are known, N and O are not. Similarly, a review of known output possibilities from the algorithms of the algorithm pool include X, K and Q, but not N and O. As Algorithm C 506 is not consistent with the JDP, block 418, it is removed from the selection group 424.

As there are more algorithms in the selection group, block 426, the next and in this case Algorithm D 508—is selected, block 428, and reviewed with respect to the JDP, block 416. In this case, Algorithm D 508 requires inputs K and L.

Branching to review the data source pool 108 and the algorithm pool 106, as in block 430, a review of the data source pool 108 indicates once again that data sources B, C, L and M are known, and only K is outstanding. However, K is known as the output from Algorithm B 504, which requires inputs X and L. Data L is present in the data source pool 108 and X is provided by Algorithm A, which in turn requires inputs A, B and C. Data elements B and C are present in the data source pool 108 and A is of course provided as user data input. The notation of each data source is captured for each algorithm in this recursive review, block 422.

The algorithm selector 104 therefore determines that Algorithm A 502 is required with user data input data A to provide output X to Algorithm B 504 that in turn is required to provide output K to Algorithm D 506 that will provide the desired result Q to the designated party. In this fashion the algorithm selector 104 has chained three algorithms together (e.g., a meta-algorithm 510) to achieve a single output for the user.

Once constructed, this meta-algorithm 510 is entirely transparent to the rest of the system and the user. Moreover, the algorithm selector 104 bundles together all of the required algorithms and data together to achieve the desired output. With respect to this example, it is further appreciated that the user has been freed of the requirement to know of each involved algorithm and the input data each requires. Indeed to the user and rest of the system, the true nature of an algorithm as a meta-algorithm is inconsequential and meta-algorithms and algorithms are viewed and treated alike.

In at least one embodiment, the nature of the problem job may be such that multiple algorithms may be determined as viable options to provide the desired output result. Different algorithms may indeed have different characteristics, such as but not limited to, precision of result, speed for completion and resource requirements.

As indicated above, the user may specify constraints and or objectives, such as derive result as quickly as possible, derive result as accurately as possible, and/or derive result with minimal system resources. In at least one embodiment, each viable algorithm and/or meta-algorithm is appointed a weighted point value for at least speed to completion, accuracy and required resources. When a user has specified a constraint and/or objective, these weighting values are utilized to select the algorithm most in compliance with the user specified constraints and/or objectives.

If the user has not specified an object of constraint, and multiple viable algorithms are determined, the system may in one embodiment be pre-configured to automatically select one algorithm, such selection being based on a pre-configured trigger selected from a group including, random selection, minimize resource selection, maximize accuracy selection, maximize speed selection. In accordance with either the user specified constraints and/or objectives, or the system pre-configured constraint and/or objective, a viable algorithm is selected from the selection group, as in block 430 leading to off page reference indicator B returning to FIG. 3.

The selected algorithm and one or more data sources are then bundled along with the user input data as a job operation, block 330. The assembled job operation is then provided to job operation subsystem 110, block 332. As noted above, the job operation subsystem may be an incorporated part of problem solving system 100 or an external system that is in communication with problem solving system 100. Further, in at least one embodiment, the job operations are provided to a job pool 112, from which the job operations are pulled for execution.

Where the job operation subsystem 110 is external to problem solving system 100, the algorithm selector 104 may utilize the input interface 102 to communicate the assembled job operation to the job operation subsystem 110. The utilization of the input interface for communication with the job operation subsystem 110 permits the interface 102 to be the responsible element for all translation to and boom the problem solving system 100. This optional configuration is indicated by the dotted communication lines in FIG. 5 between the algorithm selector 104, the input interface 102, and the job operation subsystem 110.

With respect to embodiments utilizing a job pool 112, in at least one embodiment the job operations include an priority indicator, indicating the priority of execution for the job by the job operation subsystem 110. Moreover the priority indicator permits automatic deviation from a first in first out, last in last out, or other general processing flow of execution.

With respect to the above method, it is understood and appreciated that multiple instantiations of problem solving system 100 may run concurrently, and/or problem solving system 100 is operable to receive and execute multiple instances of user supplied input data concurrently. In addition, it is to be appreciated that the problem solving system 100 can process user input data provided to add a new algorithm to the algorithm pool 106, while substantially contemporaneously processing user input data provided to remove a data source from the data source pool 108, and/or processing user input data as a problem job.

It is to be understood that for operational simplicity, in at least one embodiment the addition or removal of an algorithm or data source will not affect problem jobs currently in execution, but rather will be applied to subsequent problem jobs. It is also to be understood and appreciated that as problem solving system 100 relates to the algorithms in the algorithm pool 106 and data sources in the data source pool 108 as XML objects, so long as the defined characteristics are maintained, the actual data sources and algorithms may be updated in real time by third parties without adversely affecting the operation of the problem solving system 100.

Figure 6:
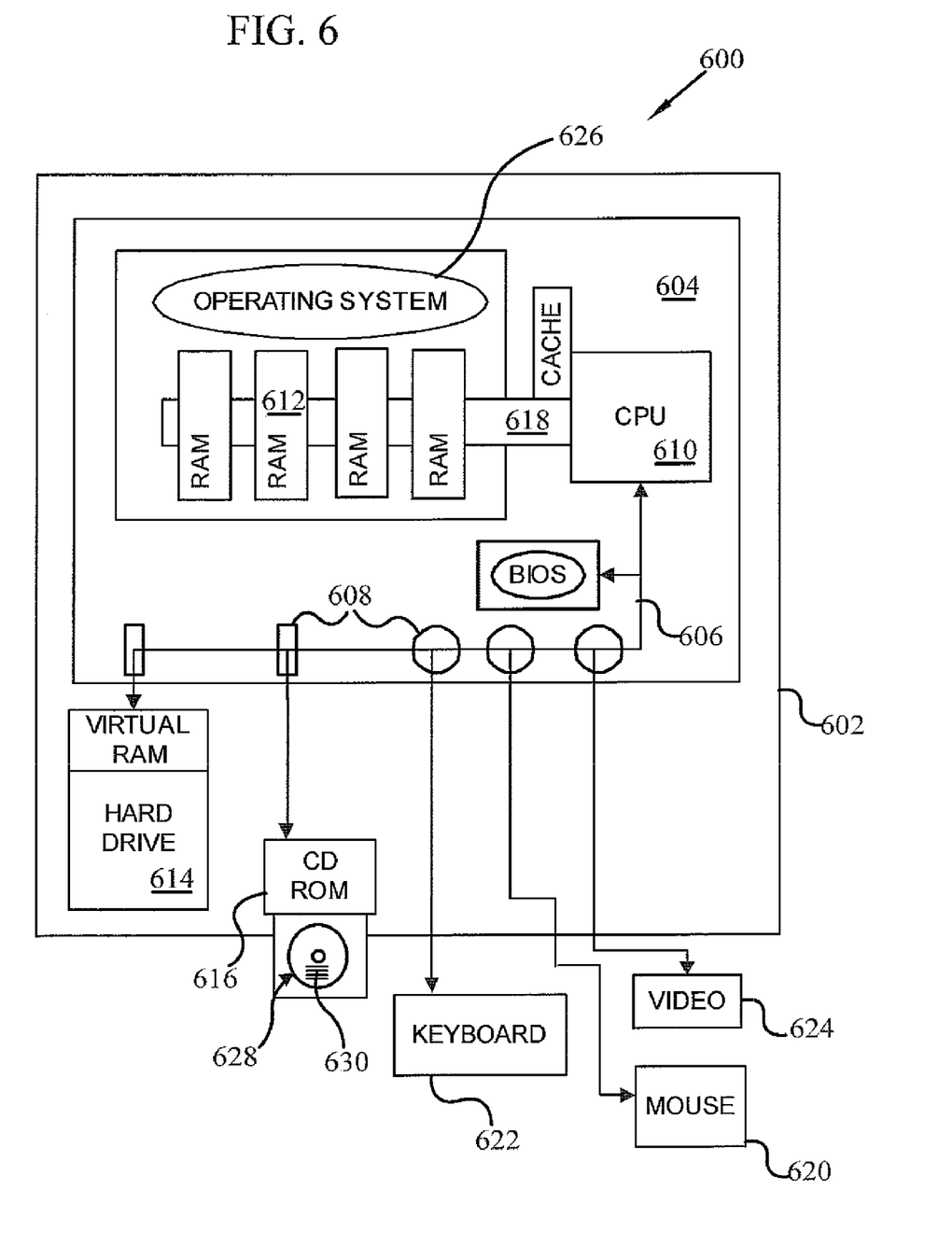
FIG. 6 is a block diagram of a computer system in accordance with one or more embodiments.

In at least one embodiment, the problem solving system 100 is implemented as a computer system for scheduling activities. FIG. 6 is a high level block diagram of an exemplary computer system 600. Computer system 600 has a case 602, enclosing a main board 604. The main board has a system bus 606, connection ports 608, a processing unit, such as Central Processing Unit (CPU) 610, and a memory storage device, such as main memory 612, hard drive 614, and CD/DVD Rom drive 616.

Memory bus 618 couples main memory 612 to CPU 610. A system bus 606 couples hard drive 614, CD/DVD Rom drive 616, and connection ports 608 to CPU 610. Multiple input devices may be provided, such as for example a mouse 620 and keyboard 622. Multiple output devices may also be provided, such as for example a video monitor 624 and a printer (not shown).

Computer system 600 may be a commercially available system, such as a desktop workstation unit provided by IBM, Dell Computers, Gateway, Apple, Sun Micro Systems, or other computer system provider. Computer system 600 may also be a networked computer system, wherein memory storage components such as hard drive 614, additional CPUs 610 and output devices such as printers are provided by physically separate computer systems commonly tied together in the network. Those skilled in the art will understand and appreciate the physical composition of components and component interconnections comprising computer system 600, and select a computer system 600 suitable for the schedules to be established and maintained.

When computer system 600 is activated, preferably an operating system 626 will load into main memory 612 as part of the boot strap startup sequence and ready the computer system 600 for operation. At the simplest level, and in the most general sense, the tasks of an operating system full into specific categories—process management, device management (including application and user interface management) and memory management.

In such a computer system 600, the CPU 610 is operable to perform one or more of the scheduling embodiments described above. Those skilled in the art will understand that a computer-readable medium 628 on which is a computer program 630 for adding activities to a schedule may be provided to the computer system 600. The form of the medium 628 and language of the program 630 are understood to be appropriate for computer system 600. Utilizing the memory stores, such as for example one or more hard drives 614 and main system memory 612, the operable CPU 602 will read the instructions provided by the computer program 630 and operate to perform the problem solving system 100 as described above.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A problem solving system for implementation on a computer, comprising:
    an interface operable to receive user supplied input data, the input data having at least one user defined characteristic that includes at least a constraint, an objective or combinations thereof, and a defined output type;
    an algorithm pool having a plurality of pre-defined algorithms, each algorithm having at least one associated algorithm characteristic;
    a data source pool having at least one data source, each data source having at least one data characteristic, the data source pool being adapted to provide an input and a parameter to the algorithm;
    an algorithm selector in communication with the interface, algorithm pool and data source pool, the algorithm selector operable to;
    receive the input data and review the at least one user defined characteristic;
    select at least one candidate algorithm from the algorithm pool in response to receipt of the input data based on availability of data associated with the candidate algorithm from the data source pool;
    evaluate the input data against the candidate algorithm, and select the algorithm based on identification and evaluation of the candidate algorithm.

2. The system of claim 1, wherein in response to the user supplied data being data source information including at least one data characteristic, the algorithm selector being operable to provide the data source information to the data source pool, the data source pool being operable to add and remove a data source during system operation.

3. The system of claim 1, wherein in response to the user supplied data being algorithm information including at least one algorithm characteristic, the algorithm selector being operable to provide the algorithm information to the algorithm pool, the algorithm pool being operable to add and remove an algorithm during system operation.

4. The system of claim 1, wherein the user defined characteristic includes one or more elements selected from the group of: problem data type, result type, party to receive output, objective for algorithm selection, case specific data for use in solving problem, and combinations thereof and wherein the at least one constraint includes a constraint on solving the problem and the objective includes an objective for algorithm selection or consideration in solving the problem.

5. The system of claim 1, wherein the data characteristic includes a location of the data source and a procedure to retrieve the data.

6. The system of claim 5, wherein at least one data source is external to the system.

7. The system of claim 1, wherein the algorithm characteristic includes a location of the algorithm, an algorithm capability description and a procedure to retrieve the algorithm.

8. The system of claim 7, wherein at least one algorithm is external to the system.

9. The system of claim 7, wherein at least one algorithm is an open source algorithm.

10. The system of claim 1, wherein the algorithm pool and the data source pool are each respectively established as XML tables.

11. The system of claim 1, wherein the selection of an algorithm further includes:
    reviewing for each algorithm in the algorithm pool a required data parameter and an output data parameter;
    populating a selection group with algorithms having an output data parameter consistent with the user defined characteristic;
    reviewing the user defined characteristic and data source pool to determine a job data parameter;
    removing from the selection group algorithms having required data parameter not available as the job data parameter;
    selecting one or more algorithms from the selection group to provide a final output parameter consistent with user defined job characteristic.

12. The system of claim 1, wherein the system is operable to receive and execute multiple instances of user supplied input data concurrently.

13. The system of claim 1, wherein the algorithm selector is operable to string at least two algorithms together, a first algorithm having an output parameter that is received as at least one input parameter of a second algorithm, an output parameter of the last algorithm consistent with user defined job characteristic.

14. A problem solving method comprising:
    establishing an algorithm pool having a plurality of pre-defined algorithms, each algorithm having at least one associated algorithm characteristic;
    establishing a data source pool having at least one data source, each data source having at least one data characteristic and providing an input and a parameter to the algorithm;
    receiving, on a processor, user data as an instruction set including:

an algorithm selection request having the at least one algorithm characteristic, a constraint, an objective or combinations thereof and a defined output type;

in response to a determination of an algorithm selection request, identifying, on the processor, the algorithm from the algorithm pool as a candidate algorithm based on availability of data associated with the algorithm from the data source pool;

evaluating, on the processor, the constraint, the objective, or the combinations thereof against the candidate algorithm; and selecting, on the processor, the algorithm based on identification of the algorithm as the candidate algorithm and evaluation against the candidate algorithm.

15. The method of claim 14, wherein a job request having at least one job characteristic, the selected algorithm and data source are bundled as a job operation for execution by a job operation subsystem, a result of the job operation returned to a party indicated by the job request.

16. The method of claim 14, wherein the user defined characteristic includes one or more elements selected from the group of: problem data type, result type, party to receive output, method to provide output, objective for algorithm selection, case specific data for use in solving problem, constraints on solving the problem, objective for consideration in solving problem, and combinations thereof.

17. The method of claim 14, wherein the data characteristic includes a location of the data source and a procedure to retrieve the data.

18. The method of claim 17, wherein at least one data source is external to the system.

19. The method of claim 14, wherein the algorithm characteristic includes a location of the algorithm, an algorithm capability description and a procedure to retrieve the algorithm.

20. The method of claim 19, wherein at least one algorithm is external to the system.

21. The method of claim 19, wherein at least one algorithm is an open source algorithm.

22. The method of claim 14, wherein the method is operable to act upon multiple instruction sets concurrently.

23. The method of claim 14, wherein the algorithm pool and the data source pool are each respectively established as XML tables.

24. The method of claim 14, wherein the method is stored on a computer readable medium as a computer program, which, when executed in a computer system will perform the method of problem solving when provided with the instruction set.

25. A non-transitory computer-readable medium on which is stored a computer program for solving problems, the computer program comprising:

an input routine operatively associated with an input device for permitting a user to enter user supplied input data, the input data having at least one user defined characteristic that includes a constraint, objective, or combinations thereof and a defined output type;

an algorithm pool routine operative to establish an algorithm pool having a plurality of pre-defined algorithms, each algorithm having at least one associated algorithm characteristic;

a data source pool routine operative to establish a data source pool having at least one data source, each data source having at least one data characteristic and providing an input and a parameter to the algorithm;

an algorithm selection routine operatively associated with the input routine, the algorithm pool routine and the data source pool routine, the algorithm selection routine being operable to;

receive the input data and review the at least one user defined characteristic;

select at least one candidate algorithm from the algorithm pool in response to receipt of the input data based on availability of data associated with the candidate algorithm from the data source pool;

evaluate the input data against the candidate algorithm, and select the algorithm based on identification and evaluation of the candidate algorithm.

26. The computer-readable medium of claim 25, wherein in response to the user supplied data being data source information including at least one data characteristic, the algorithm selector being operable to provide the data source information to the data source pool, the data source pool being operable to add and remove a data source during system operation.

27. The computer-readable medium of claim 25, wherein in response to the user supplied data being algorithm information including at least one algorithm characteristic, the algorithm selector being operable to provide the algorithm information to the algorithm pool, the algorithm pool being operable to add and remove an algorithm during system operation.

28. The computer-readable medium of claim 25, wherein the user defined characteristic includes one or more elements selected from the group of: problem data type, result type, party to receive output, method to provide output, objective for algorithm selection, case specific data for use in solving problem, constraints on solving the problem, objective for consideration in solving problem, and combinations thereof.

29. The computer-readable medium of claim 25, wherein the data characteristic includes a location of the data source and a procedure to retrieve the data.

30. The computer-readable medium of claim 29, wherein at least one data source is external to the system.

31. The computer-readable medium of claim 25, wherein the algorithm characteristic includes a location of the algorithm, an algorithm capability description and a procedure to retrieve the algorithm.

32. The computer-readable medium of claim 31, wherein at least one algorithm is external to the system.

33. The computer-readable medium of claim 31, wherein at least one algorithm is an open source algorithm.

* * * * *